United States Patent [19]
Colford et al.

[11] Patent Number: 4,589,347
[45] Date of Patent: May 20, 1986

[54] ELASTOMERIC MOUNTINGS

[75] Inventors: Terence H. Colford, Leicester; Reginald Harrison, Oadby, both of England

[73] Assignee: Dunlop Limited, London, England

[21] Appl. No.: 463,080

[22] Filed: Feb. 2, 1983

[30] Foreign Application Priority Data

Feb. 11, 1982 [GB] United Kingdom ............... 8204044

[51] Int. Cl.$^4$ .............................................. B61F 5/30
[52] U.S. Cl. .................................... 105/224.1; 267/3; 267/63 A; 267/141.1
[58] Field of Search ............. 105/224.1, 224 R, 453; 267/3, 63 A, 63 R, 153, 141.1

[56] References Cited

U.S. PATENT DOCUMENTS

| | | | |
|---|---|---|---|
| 1,930,067 | 10/1933 | Tibbetts | 267/63 A X |
| 2,009,059 | 7/1935 | Brennan et al. | 267/3 X |
| 2,713,485 | 7/1955 | Tillou | 267/63 R |
| 2,854,232 | 9/1958 | Boschi | 267/141.1 X |
| 2,873,110 | 2/1959 | Jonsson | 267/63 R X |
| 2,893,570 | 7/1959 | Mulcahy | 267/63 A X |
| 3,047,163 | 7/1962 | Johnson et al. | 267/63 R X |
| 3,429,622 | 2/1969 | Lee et al. | 267/141.1 X |
| 3,544,415 | 12/1970 | Price et al. | 267/141.1 X |
| 3,830,483 | 8/1974 | Gaydecki | 267/63 A |

FOREIGN PATENT DOCUMENTS

| | | | |
|---|---|---|---|
| 552456 | 12/1959 | Belgium | 267/63 R |
| 1530164 | 3/1972 | Fed. Rep. of Germany | 105/224.1 |
| 2067479 | 8/1971 | France | 105/224.1 |
| 2363469 | 3/1978 | France | 105/224.1 |
| 454940 | 6/1968 | Switzerland | 105/224.1 |
| 362470 | 11/1931 | United Kingdom | 267/63 R |
| 487346 | 6/1938 | United Kingdom | 267/63 R |
| 522853 | 6/1940 | United Kingdom | 267/141.1 |
| 753995 | 8/1956 | United Kingdom | 105/224.1 |
| 877713 | 9/1961 | United Kingdom | 267/63 R |
| 950695 | 2/1964 | United Kingdom | 105/224.1 |
| 1161839 | 8/1969 | United Kingdom | 105/224.1 |
| 1335208 | 10/1973 | United Kingdom | 105/224.1 |
| 1531352 | 11/1978 | United Kingdom | 267/153 |

Primary Examiner—Randolph A. Reese
Attorney, Agent, or Firm—Stevens, Davis, Miller & Mosher

[57] ABSTRACT

An elastomeric mounting comprises a plurality of elastomeric layers having a plurality of reinforcement layers interleaved between and bonded to the elastomeric layers wherein confronting surfaces of the reinforcement layers are of corrugated profile having a plurality of peaks and valleys and are arranged so that the peaks of one surface are aligned with the valleys of the other surface. The reinforcement layers may all be the same size and shape and maybe disposed either vertically above one another or in echelon.

10 Claims, 10 Drawing Figures

ELASTOMERIC MOUNTINGS

This invention relates to elastomeric mountings and in particular, though not exclusively to mountings for use as an alternative to conventional chevron type springs comprising an interleaved arrangement of angled metal plates and one or more layers of elastomeric material.

A common application for chevron type springs is in railway vehicle suspensions where it is the practice resiliently to interconnect an axle box and bogie frame by means of a pair of chevron springs arranged in an inclined manner with the apex lines of the metal plates at a small angle to the vertical.

To obtain maximum efficiency from a spring of this type it is desirable to provide the best possible uniformity of stressing of the rubber and metal materials. Otherwise, to avoid premature fatigue failure at the points of maximum stress, it is necessary to form the spring larger than would be necessary if the materials were uniformly stressed. Apart from being inefficient in use of materials this can be a disadvantage in applications such as railway vehicle suspensions where space commonly is at a premium.

To achieve a substantial degree of uniformity of stressing it is usual in a spring having, say, seven metal plates and six rubber interleaves, for the metal plates to vary progressively in shape from being relatively deep (in the line of the apex) and narrow at one end to shallow and broad at the other end. The relatively deep and narrow end plate is provided at an "inner" end of the spring, with the other plates and layers extending from those surfaces of the "inner" plate facing away from one another. With this variation in width the bending moments on the plates are kept substantially uniform. The variation in length, from deep to shallow, is such that there is a substantially similar bonded area between each plate and rubber layer, and this assists in avoiding unnecessary use of materials as well as providing the commonly required relatively large deflection capability in the direction of the apex line of the plate.

While the above considerations lead to a spring design which is both economical and efficient in use of materials, the spring is of an irregular shape and not well adapted for use in situations where space is limited.

Where the requirement to satisfy space considerations is paramount it is the practice to employ springs in which the angled metal plates are of similar shape and size. In use this does, however, result in considerable and damaging stress concentration at the apices of the metal plates and it is therefore necessary to replace the spring at relatively frequent intervals.

The invention as claimed is intended to remedy these drawbacks. It provides a mounting for use as an alternative to conventional type chevron springs which is of compact shape without introducing an area susceptible to premature fatigue failure in the mounting by utilizing a construction comprising a stack of elastomeric layers having substantially inextensible reinforcement layers interleaved between and bonded to the elastomeric layers in which the confronting surfaces of successive reinforcement layers are each of corrugated profile having a plurality of alternate peaks and valleys.

The main advantage offered by the invention is that for a given load requirement the stress concentrations are more evenly distributed throughout the corrugated reinforcement layers of the mounting according to the present invention as compared with a chevron spring in which the reinforcement layers are of V-shaped cross-section and hence the fatigue life of the mounting is improved. Furthermore it is possible to obtain this even distribution of stress concentration in the mounting according to the present invention with reinforcement layers of identical shape and size with the result that for a given load requirement the mounting occupies a smaller space envelope than a comparable chevron spring thereby facilitating the incorporation of the mounting in a rail vehicle axle suspension where the space available for the mounting is limited.

The corrugated shape may, for example, be a zig-zag shape in cross-section, i.e. a series of substantially straight portions angled relative to one another, or may comprise a series of curved portions having, for example, a sinusoidal type shape in cross-section.

Preferably the confronting surfaces of successive reinforcement layers are arranged so that the peaks of one surface are aligned with the valleys of the other surface and vice versa.

The peaks of one surface may lie within the valleys of the confronting surface but more preferably lie outside the valleys.

Preferably the peaks and valleys are substantially straight and parallel to one another and more preferably are linear and continuous across the surface of the associated reinforcement layer.

Preferably the peaks are of uniform cross-section and said valleys are preferably also of uniform cross-section, said cross-sections being taken normal to the longitudinal axis of the peaks and valleys.

Preferably the reinforcement layers are of identical shape and size. All the layers may lie vertically above one another or the layers may be progressively offset laterally from one end of the mounting to the other i.e. arranged in echelon.

The number of peaks and the distance between the peaks of any one surface may be selected to give a balanced construction in which different parts of the mounting are substantially equally stressed when the mounting is loaded respectively in each of its three mutually perpendicular principal directions.

The elastomeric layer between a pair of confronting surfaces may be relieved in the vicinity of one or more peaks of the confronting surfaces, for example, it may be "cored" by drilling or molding the elastomer so that the elastomer is formed with one or more holes extending through the elastomer parallel to and in the vicinity of one or more peaks. Coring may be employed to reduce stress concentration in the interleaving elastomer and reinforcement layers.

The invention will now be described in more detail, by way of example only, with reference to the accompanying drawings in which.

Figure 1:
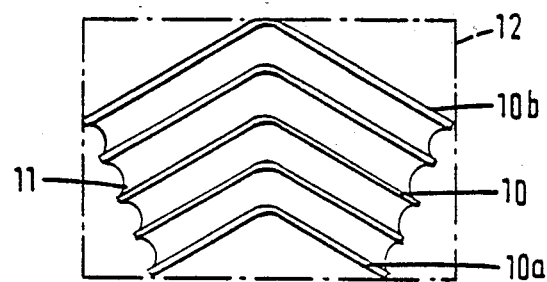
FIG. 1 is a plan view of a known chevron spring for use in a railway vehicle suspension.
Figure 2:
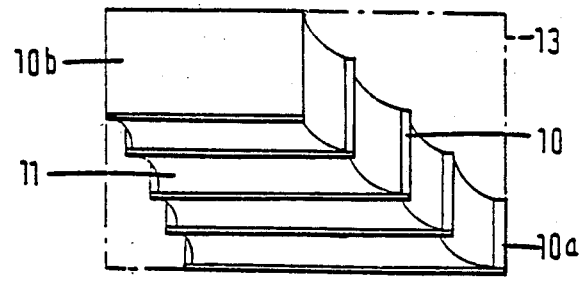
FIG. 2 is a side view of the spring of FIG. 1.

A known chevron spring illustrated in FIGS. 1 and 2 of the accompanying drawings comprises five angled metal plates 10 of V-shape in cross-section having located therebetween and bonded thereto four rubber interleaving layers 11. The metal plates and rubber layers are arranged in echelon, when unstressed, as shown in FIG. 2. An inner end plate 10a is of a relatively narrow and deep shape compared with an outer end plate 10b of relatively broad and shallow shape with the intermediate plates 10 of progressively varied intermediate dimensions such that each bonded surface area is substantially equal. Also shown in FIGS. 1 and 2 are the outlines 12,13 of rectangles defining the limits of the spring shape in plan and side view respectively, and from these it will be seen that a significant proportion of the overall space envelope in each of said views is not occupied and usefully employed by components of the spring.

Figure 3:
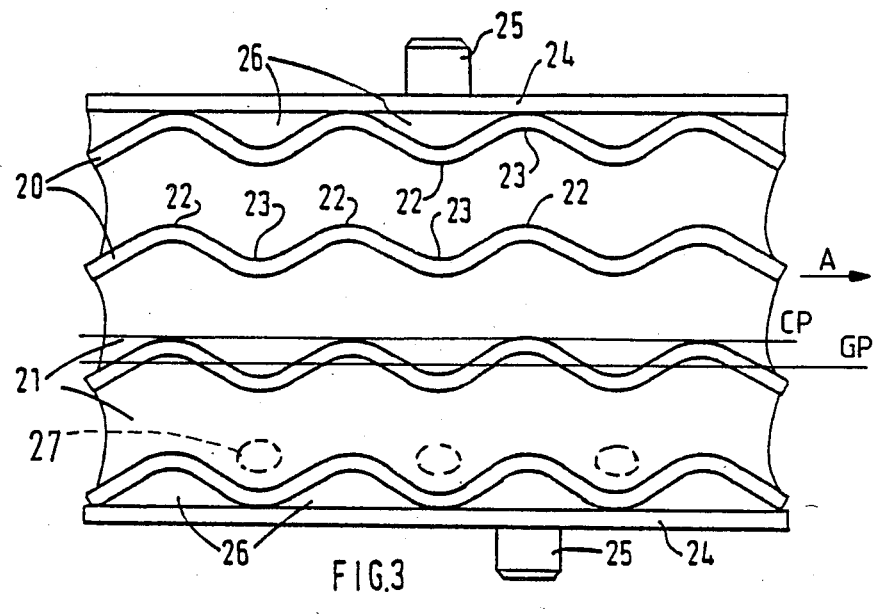
FIG. 3 is an end view of a mounting in accordance with the present invention for use in a railway vehicle suspension.
Figure 4:
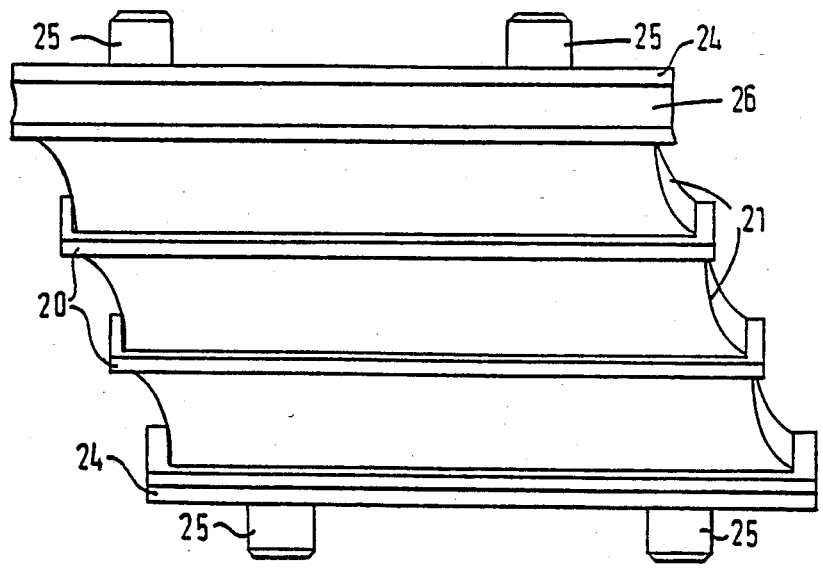
FIG. 4 is a side view of the mounting of FIG. 3.
Figure 5:
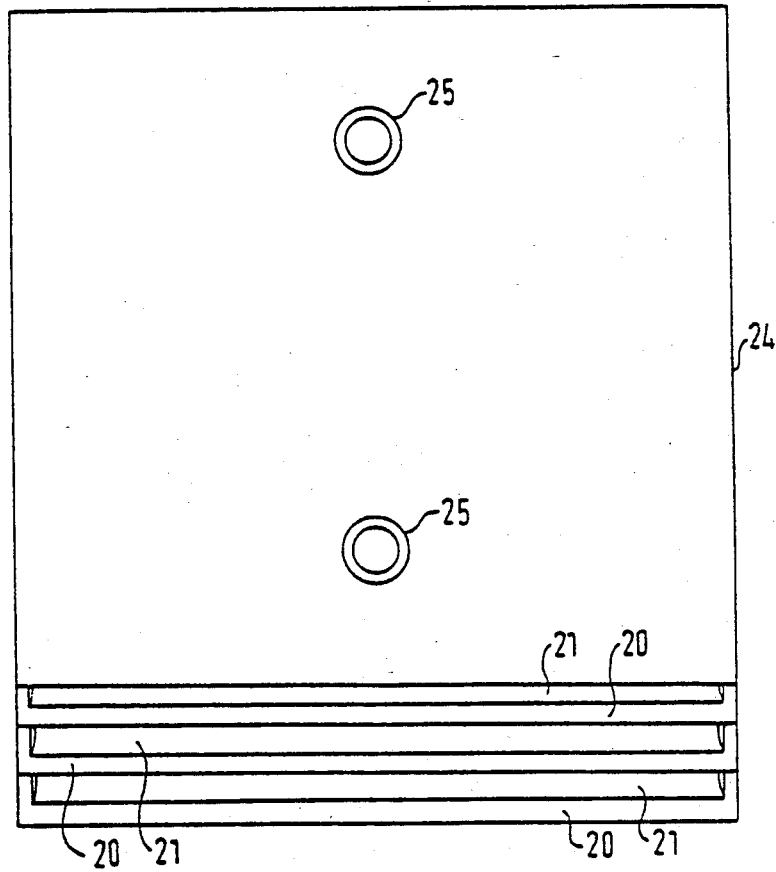
FIG. 5 is a plan view of the mounting of FIGS. 3 and 4.

Referring now to FIGS. 3 to 5 of the accompanying drawings there is illustrated a mounting in accordance with the present invention and comprising a stack of four metal plates 20 having three interleaving rubber layers 21 located therebetween. All the plates 20 are of identical size and shape, and likewise, the rubber layers are all of similar size and shape.

The surfaces of the plates 20 are of a generally zig-zag shape having a plurality of inclined portions defining alternate peaks 22 and valleys 23 which are substantially straight in the direction of their length and extend parallel to one another. The peaks 22 and valleys 23 are continuous across the surfaces of the plates 20 and are each of uniform cross-section, said cross-section being taken normal to the longitudinal axis of the peaks and valleys.

The plates 20 are arranged so that the peaks 22 in the surface of one plate 20 are aligned with but lie outside the valleys 23 in the confronting surface of the adjacent plate 20. The apices of the peaks 22 of each surface lie in respective common planes CP (one only shown) which extend parallel to the general plane GP of the plate and normal to the longitudinal axis of the mounting. Optionally each rubber layer may be cored or otherwise relieved in the vicinity of one or more peaks as shown in broken lines in FIG. 3.

Successive plates 20 and interleaving rubber layers 21 are progressively offset laterally (FIGS. 4 and 5) from one end of the mounting to the other, i.e. arranged in echelon, when unstressed.

The stack of four plates 20 and three rubber layers 21 is located between a pair of flat metal end plates 24 each provided with location studs 25. The spaces between the end plates 24 and the adjacent metal plates 20 are occupied by rubber segments 26 bonded to the plates.

In operation of the mounting it is found that by virtue of the substantially zig-zag profile of the confronting surfaces of the plates 20 and the rubber layers 21 therebetween there is acheved a relatively high transverse stiffness, i.e. resistance to relative movement of successive plates in a direction indicated by the arrow A (FIG. 3) perpendicular to the direction in which the peaks extend without the need to provide metal plates and rubber layers of V-shaped cross-section as in a conventional chevron spring.

In respect of the previously experienced problems of high bending moment stresses on the metal plates it is believed that despite the absence of width variation this does not present a significant problem in the present construction. In particular, it is believed that the bending moment stresses in the plates are less in the construction according to the present invention since by virtue of the zig-zag profile of the confronting surfaces of the plates 20 and the rubber layers 21 therebetween as shown in FIG. 3, any localized stressing of the rubber material is less intense than in a conventional chevron spring.

In consequence of the reduced stress levels experienced by the plates having corrugated surfaces as opposed to similar size plates of simple V-shape in cross-section it is possible to selectively provide mountings having either thinner metal plates or a longer fatigue life for a given load requirement.

The optional coring 27 of the rubber layers is believed to assist further in reducing angular movement between successive inclined portions of each of the metal plates 20.

From FIGS. 3 to 5 it will be appreciated that compared with a conventional chevron spring as illustrated in FIGS. 1 and 2, only a very small proportion of the space envelope defined by the overall dimensions of the mounting is not occupied and usefully employed by the components of the mounting.

While it is preferred that all the metal plates are of similar shape and size, and likewise the rubber layers therebetween, it is to be understood that this is not essential to the main feature of the invention which is the provision of plates having a plurality of peaks and valleys so as to be of corrugated form. Thus the invention also provides a mounting in which the successive plates may vary in overall shape substantially in the same manner as those of the conventional chevron spring illustrated in FIGS. 1 and 2, i.e. varying from narrow and deep at one end to broad and shallow at the other end of the spring.

Irrespective of whether or not the corrugated plates are all of similar shape and size, the distance between the peaks of each plate may be identical or may vary progressively from one plate to another depending on the overall characteristics required of the mounting. The spacing between peaks of each plate may increase progressively for successive plates such that imaginary lines drawn through corresponding peaks of successive plates are inclined relative to one another.

Figure 6:
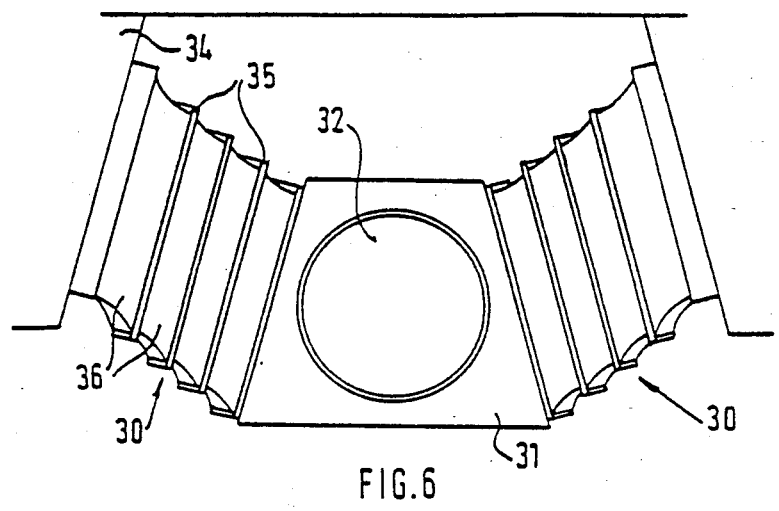
FIG. 6 is a schematic side view of a railway vehicle suspension incorporating the mounting of FIGS. 3 to 5.
Figure 7:
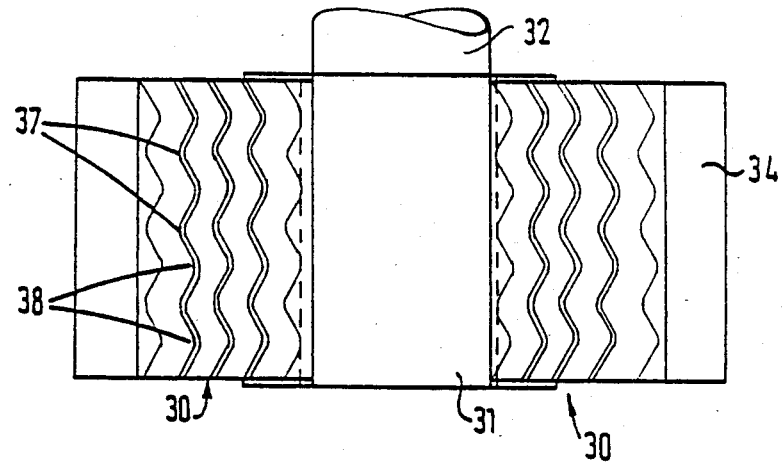
FIG. 7 is a plan view of the suspension shown in FIG. 6.

Referring now to FIGS. 6 and 7 there is shown a railway vehicle suspension incorporating mountings 30 similar to the mounting described above with reference to FIGS. 3 to 5.

The suspension comprises an axle box 31 having a central opening in which one end of an axle 32 is rotatably received and a pair of mountings 30 mounted fore and aft of the axle box 31 in the longitudinal direction of the vehicle and extending between the axle box and a bogie frame 34. Each mounting 30 is similar to that described with reference to FIGS. 3 to 5 comprising a stack of metal plates 35 having rubber layers 36 interleaved between and bonded to the plates 35. The plates 35 are of identical size and shape, likewise the rubber layers 36, and are progressively offset from one end of the spring to the other, i.e. arranged in echelon. The surfaces of the plates 35 are of zig-zag profile having alternate peaks 37 and valleys 38 which are substantially straight in the direction of their length and extend parallel to one another. The peaks 37 and valleys 38 are continuous across the surfaces of the plates 35 and are each of uniform cross-section, said cross-section being taken normal to the longitudinal axis of the peaks and valleys. The plates 35 are arranged so that the peaks 37 in the surface of one plate 35 are aligned with but lie outside the valleys 38 in the confronting surface of the adjacent plate 35.

As shown in FIG. 6 the mountings 30 extend upwardly and outwardly from the axle box 31 in a veearrangement with the longitudinal axes of the mountings inclined at equal and opposite angles to the vertical and horizontal. As a result the rubber layers are loaded in compression and shear for loads applied vertically and longitudinally of the vehicle.

As shown in FIG. 7 the mountings 30 are arranged with the longitudinal axes of the peaks and valleys extending in a direction transverse to the direction in which the axle extends. As a result the rubber layers are also loaded in compression and shear for loads applied laterally of the vehicle and the stiffness of the mountings in a direction parallel to the axle, i.e. transverse to the direction in which the peaks and valleys extend, is increased as compared with a mounting in which the layers are flat.

The mountings 30 have characteristics similar to a chevron spring when installed in a suspension as above described but have the advantage of occupying a smaller space envelope for a given load requirement.

Figure 8:
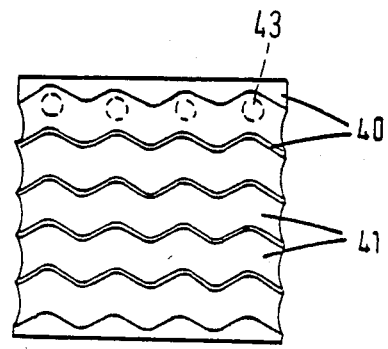
FIG. 8 is a side view of another mounting in accordance with the present invention.
Figure 9:
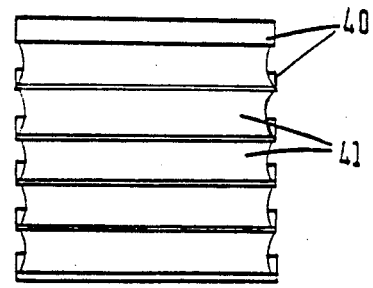
FIG. 9 is an end view of the mounting shown in FIG. 8.

The scope of the invention is not restricted to mountings for use as alternatives to conventional chevron type springs. Thus, by way of further example, a mounting in accordance with the invention is suitable for mounting with the plates and rubber interlayers extending substantially horizontally. One such type of application is as the side bearer mountings of a railway vehicle suspension, and a form of mounting for use in that type of application is shown in FIGS. 6 and 7. The mounting (see FIG. 8) comprises a stack of six metal plates 40 having corrugated surfaces and five rubber interlayers 41 bonded to the corrugated surfaces of successive plates.

Figure 10:
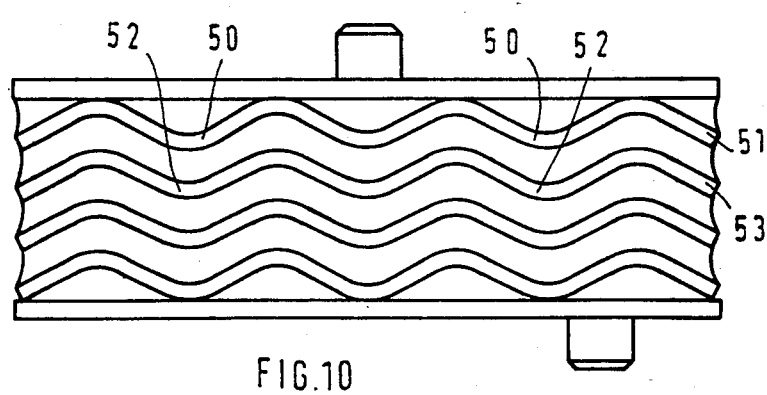
FIG. 10 is an end view similar to FIG. 3, but showing an embodiment in which peaks of one surface project into the valleys of an adjacent surface.

The corrugated surfaces comprise alternate peaks and valleys constructed and arranged substantially as described previously with reference to the embodiment of FIGS. 3 to 5. In contrast to the echelon arrangement shown in FIG. 4, in this construction the plates and layers are vertically aligned, and when in use in a side bearer application the metal plates extend generally in a horizontal plane. Also the outer end plates each have an inwardly directed face which is corrugated so that a corrugated shape rubber layer may be bonded directly to an end plate. Optionally each rubber layer may be cored 43 or otherwise relieved in the vicinity of one or more peaks as shown in broken lines. The cores extending parallel to the peaks and valleys. As shown in FIG. 10, the peaks 50 of one surface of a corrugated plate 51 may be arranged to project into the valleys 52 of a confronting plate 53.

Having now described our invention, what we claim is:

1. A vehicle axle suspension comprising an axle box rotatably mounting one end of an axle and a pair of elastomeric mountings arranged fore and aft of the axle box and a vehicle frame in a V-arrangement such that the longitudinal axes of said mountings are inclined to the vertical and horizontal, each mounting comprising a pair of end faces for subjecting the mounting to a load, a plurality of elastomeric layers having a plurality of substantially inextensible reinforcement layers interleaved between and bonded to said elastomeric layers so as to be able to accommodate relative movement between opposed end faces in three mutually perpendicular directions, said reinforcement layers being of substantially identical size and shape, confronting surfaces of successive reinforcement layers each being of corrugated profile having a plurality of alternate peaks and valleys, said peaks and valley being substantially straight and parallel to one another and extending in a direction transverse to the direction in which said axle extends with the peaks of one surface being aligned with the valleys of the other surface.

2. A suspension according to claim 1 wherein said peaks and valleys are lineal and continuous across the surface of the associated reinforcement layer.

3. A suspension according to claim 1 wherein said peaks are of uniform cross-section, said cross-section being taken normal to the longitudinal axes of said peaks.

4. A suspension according to claim 1 wherein said valleys are of uniform cross-section, said cross-section being taken normal to the longitudinal axes of said valleys.

5. A suspension according to claim 1 wherein said peaks of one surface project into said valleys of the other surface.

6. A suspension according to claim 1 wherein said peaks of one surface lie outside said valleys of the other surface.

7. A suspension according to claim 1 wherein said reinforcement layers are arranged in echelon.

8. A suspension according to claim 1 wherein said elastomeric layer between a pair of reinforcement layers is relieved in the vicinity of at least one of the peaks of said confronting surfaces.

9. A suspension according to claim 8 wherein said elastomeric layer is relieved by forming at least one hole in the elastomer, the hole extending parallel to said peaks.

10. A vehicle axle suspension according to claim 1, wherein the peaks have apices and the apices of confronting surfaces lie in a common plane.

* * * * *